March 1, 1966 M. M. BACKUS 3,238,499
FILTERING TECHNIQUES AND A FILTER FOR ELIMINATING MULTIPLE
REFLECTIONS OCCURRING IN THE DETECTED SIGNALS OF MARINE
SEISMIC EXPLORATION
Filed Dec. 24, 1958
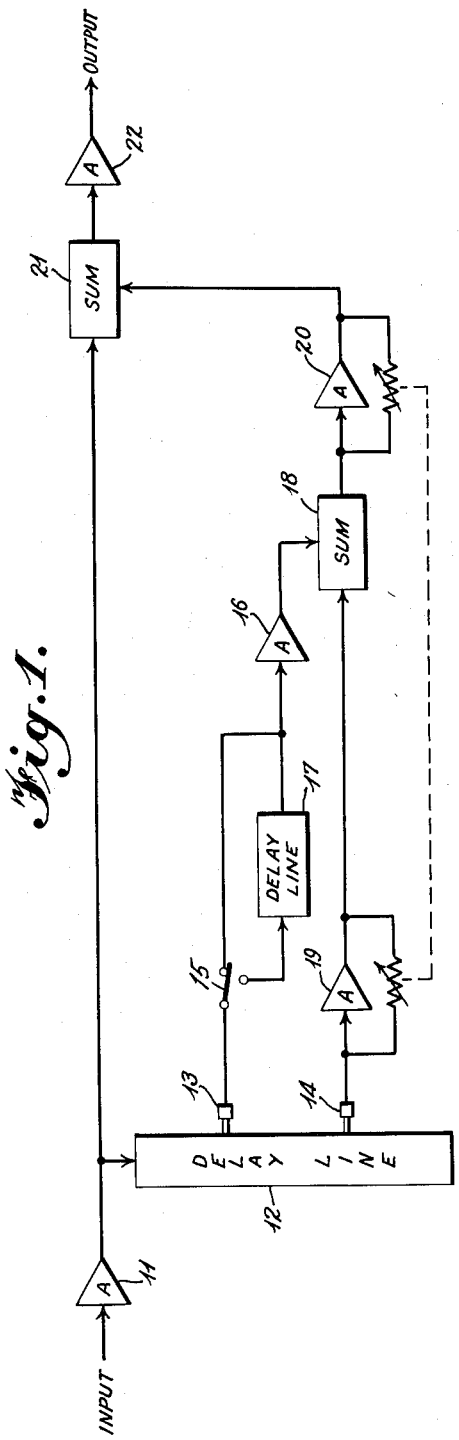
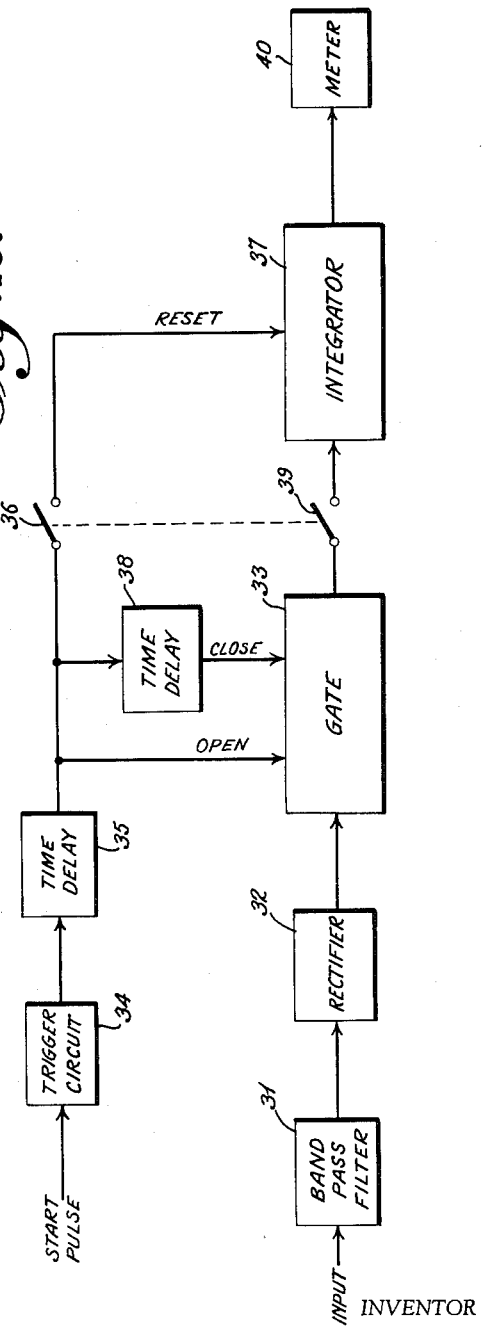
INVENTOR
*Milo M. Backus*
BY *Stevens, Davis, Miller & Mosher*
ATTORNEYS United States Patent Office 3,238,499
Patented Mar. 1, 1966

3,238,499
FILTERING TECHNIQUES AND A FILTER FOR ELIMINATING MULTIPLE REFLECTIONS OCCURRING IN THE DETECTED SIGNALS OF MARINE SEISMIC EXPLORATION
Milo M. Backus, Dallas, Tex., assignor to Texas Instruments Incorporated, Dallas, Tex., a corporation of Delaware
Filed Dec. 24, 1958, Ser. No. 782,942
13 Claims. (Cl. 340—15.5)

This invention relates to a method and apparatus for eliminating water reverberations which occur in marine seismic exploration.

One of the major problems in marine seismic prospecting is the existence of water multiples or water reverberations in the detected signal. The existence of the water energy trap results in an obliteration or confusion of the desired sub-surface structural data. The prior art methods of handling this problem utilize standard techniques largely based on periodicity and progressive dip criteria and lead only to an acceptance or rejection of structural data based on an estimate of the degree of the water reverberation effect. By means of the present invention, the reverberation effect is substantially reduced and thus the valid structural data is recovered. The seismic signal obtained is substantially the same as that which would be obtained on land or with the water layer removed.

When the seismic reflection signal passes through the water layer, the water layer operates on the seismic signal like an undesirable filter. According to the invention, the effect of this undesirable water layer filter is eliminated by passing the signal through another filter which is the inverse of the water layer filter.

This filter can be synthesized by means of a delay line. In its simplest form the filter comprises a two point delay line, an amplifier connected to amplify the output of the delay line and a summing circuit connected to algebraically add the amplified output signal from the delay line to the input signal to the delay line. The delay provided by the delay line is adjusted to equal the time interval required for a sound wave to travel back and forth through the water layer. The total gain of the delayed signal from the input of the delay line to the summing circuit is adjusted to equal the product of the reflection coefficients of the water-earth boundary and the water-air boundary. This filter removes the effect of a single pass through the water layer filter and provides a signal which represents the up-travelling energy impinging on the bottom of the water layer.

To eliminate the reverberation effect completely for primary subsurface reflections in the water layer, a more sophisticated filter is used. This more sophisticated filter comprises a three point delay line providing two delayed output signals, amplifiers connected to amplify the output signals from the delay line, and a summing circuit to algebraically add the input signal applied to the delay line with the two amplified output signals from the delay line. The delay line is adjusted so that the first output signal from the delay line is delayed by an amount equal to the time interval required for a sound wave to travel back and forth through the water layer. The delay line is adjusted to delay the second output signal by an amount equal to twice that by which the first signal is delayed. The amplifiers are adjusted so that the total gain of the first output signal from the input to the delay line to the summing circuit is equal to twice the product of the reflection coefficients and the total gain of the second output signal from the input to the delay line to the summing circuit is equal to the product of the reflection coefficients squared.

A metering circuit is provided which is used in a method of empirically determining the adjustments to be made to the delay line and the amplifiers.

Other objects and advantages of the invention will become readily apparent as the following description of a preferred embodiment unfolds and when taken in conjunction with drawings wherein:

FIG. 1 illustrates in block form the filter of the invention; and

FIG. 2 shows in block form the metering circuit for empirically determining the values to be used in the filter.

In its simplest form, a filter which is the inverse of the filtering effect of the water layer in marine seismic exploration is a filter which will produce an output signal $g(t)$ which is related to its input signal $f(t)$ by the formula:

$$g(t) = f(t) + Kf(t-T) \tag{1}$$

In this formula K equals the product of the reflection coefficients of the water-earth boundary and the water-air boundary and T equals the time it takes a sound wave to travel back and forth in the water layer. The more sophisticated filter, to eliminate the second mode of the reverberations in the water layer, will produce an output signal $g(t)$ which is related to input signal $f(t)$ according to the formula:

$$g(t) = f(t) + 2Kf(t-T) + K^2f(t-2T) \tag{2}$$

FIGURE 1 illustrates a filter for producing an output in accordance with Formula 2. As shown in FIGURE 1, the detected seismic signal, which may be taken from a seismic magnetic recording, is applied through amplifier 11 to delay line 12. The purpose of the amplifier 11 is to raise the signal level and to provide a proper impedance match to the delay line. Taps are provided on the delay line 12 at one millisecond intervals. Connection may be made to any one of these output taps by means of jacks 13 and 14. Thus, two output signals may be derived from the delay line 12 with delays adjustable in increments of one millisecond. The output signal derived by the jack 13 is passed over a switch 15 directly to an amplifier 16 or selectively through a one half millisecond delay line 17 to the amplifier 16. The amplifier 16 has a selectable gain of ±1 or ±2, and the output signal therefrom is applied to a summing circuit 18. The output signal derived by the jack 14 is applied through a variable gain amplifier 19 to the summing circuit 18. The summing circuit 18 algebraically adds the two applied signals from the amplifiers 16 and 19 and applies the resulting output signal to a variable gain amplifier 20. The controls for the variable gain amplifiers 19 and 20 are ganged and are adjusted so that the gain of each of the amplifiers 19 and 20 are always equal. The output signal from the amplifier 20 is applied to a summing circuit 21. The output signal from the amplifier 11 which is applied to the delay line 12 is also applied to the summing circuit 21. The summing circuit 21 algebraically adds the two applied signals and applies them to an amplifier 22, the output of which comprises the output signal of the filter. The function of the amplifier 22 is to provide the desired level of the output signal and the gain of this amplifier may be selected from a plurality of selected values.

In operation of the circuit, the jacks 13 and 14 and the switch 15 are always adjusted so that the total delay of the signal applied to the amplifier 16 is always exactly one-half of the delay of the signal applied to the amplifier 19. The jack 13 and the switch 15 are positioned so that the delay of the signal applied to the amplifier 16 is equal to the value T and the jack 14 is adjusted so that the delay of the signal applied to the amplifier 19 is equal to the value 2T. Each of the amplifiers 11, 16, 19, 20 and 22 invert the input signal, but each signal component is inverted an even number of times so the inversion caused by the amplifiers has no effect. In the actual circuit the delay line 17 is split into two halves which may be selectively switched into the circuit on each side of the amplifier 16, but for convenience of illustration the delay line 17 is shown as a single unit.

When the input signal $f(t)$ is applied to the amplifier 11, the output signal produced from the amplifier will be $-G_1f(t)$ in which $G_1$ is the gain of the amplifier 11. When this signal is applied to the delay line 12 and the jack 13 and the switch 15 are properly positioned to provide a delay of T, the signal applied to the amplifier 16 will be $-G_1K_Tf(t-T)$ in which $K_T$ is an attenuation factor caused by the delay line. This attenuation factor is directly proportional to the delay provided by the delay line. With jack 14 correctly positioned to provide a delay of 2T, the signal applied to the amplifier 19 will be $-G_1K_T^2f(t-2T)$. In this formula, the attenuation factor $K_T$ is squared because it must pass through a delay line of twice the length of that through which the signal applied to amplifier 16 must pass. The amplifier 16 has a fixed gain of 2 and accordingly its output signal will be $2G_1K_Tf(t-T)$. Letting the gain of amplifier 19 be represented by $K_1$, the output signal from the amplifier 19 will be $G_1K_T^2K_1f(t-2T)$. The resulting output signal from the summing circuit 18 will be the output of the amplifier 16 algebraically added to the output of the variable gain amplifier 19 which is:

$$2G_1K_Tf(t-T)+G_1K_T^2K_1f(t-2T)$$

The gain of the amplifier 20 will also be $K_1$ since it must have the same gain as the amplifier 19. When the output signal from the summing circuit 18 is applied to the amplifier 20, the resulting output signal from the amplifier 20 will be:

$$-2G_1K_TK_1f(t-T)-G_1K_T^2K_1^2f(t-2T)$$

When this signal is algebraically added to the output signal from the amplifier 11 in the summing circuit 21, the result will be:

$$-G_1f(t)-2G_1K_TK_1f(t-T)-G_1K_T^2K_1^2f(t-2T)$$

The gain of amplifier 22 is designated $G_2$ and therefore when the output signal from the summing circuit 21 is applied to the amplifier 22, the resulting output signal from the amplifier 22 will be:

$$G_1G_2[f(t)+2K_TK_1f(t-T)+K_T^2K_1^2f(t-2T)]$$

In operation the gain $K_1$ of amplifiers 19 and 20 will be adjusted so that $K_1K_T=K$ (the product of the reflection coefficients). The output signal from the filter circuit will therefore be:

$$G_1G_2[f(t)+2Kf(t-T)+K^2f(t-2T)]$$

and thus the filter for Formula 2 is synthesized.

When the filter for Formula 1 is to be synthesized, the jack 14 is disconnected and the gain of amplifier 16 is changed to 1. The output from the amplifier 22 will then be:

$$G_1G_2f(t)+Kf(t-T)$$

For this filtering technique to be effective it is necessary to determine T, the effective water trap depth, and K, the product of the trap boundary reflection coefficients, for each seismic profile. The technique for this determination is based on the developed theory and provides a true estimate of the desired parameters when the Fourier power spectrum of the energy returning from the subsurface is reasonably well behaved. In cases where this assumption breaks down radically, the filter determined constitutes the optimum selective filter based on viewing the reverberations as noise. In many areas a low velocity layer exists at the water bottom, which is similar in its effects on the seismic data to the "weathering" layer in land seismic operations. The conventional FATHOMETER provides only the depth to the top of this layer. The determination of T however, provides the travel time to the base of the low velocity layer. It thus constitutes a unique technique for the determination of the "weathering" correction in marine operations.

To determine the values of T and K empirically the circuit of FIGURE 2 is used. This circuit will rectify an applied signal and then integrate a selected part of the rectified signal. The signal to be rectified and integrated is applied to the input of band pass filter 31. The output from the band pass filter is rectified by rectifier 32 and applied to a gate 33. To operate the circuit a start pulse is applied to trigger circuit 34 which in response to the applied start pulse will trigger the time delay circuit 35. The time delay circuit 35 is adjustable and will produce an output signal after a selectable time interval. This output signal is applied over a switch 36 to integrator 37 to reset the integrator to zero. The output signal from the time delay circuit 35 is also applied to the gate 33 to open this gate and to another time delay circuit 38. In response to this applied signal, the time delay circuit 38 will apply a signal to the gate 33 after a predetermined time interval to close the gate 33. The output from the gate 33 is applied over a switch 39 to the integrator 37. During the time interval that gate 33 is open, the output signal from the rectifier 32 will pass through the gate 33 and will be integrated by the integrator 37. A meter 40 provides an indication of the integrated result produced by integrator 37. Thus, the meter 40 will indicate the value of the integral for a predetermined part of the rectified input signal. The part which is integrated is determined by the two time delay circuits 35 and 38. The time delay circuit 35 determines when the integration will start by opening gate 33. Since this time delay circuit is adjustable to produce an output signal after a selected interval, the start of the integration of the rectified input signal may occur whenever desired. The time delay circuit 38 determines when the integration will end by closing the gate 33 and thus the time delay circuit 38 determines the length of the time interval for the integration.

The reading on the meter is thus $$\int_{t_1}^{t_2}|g(t)|dtg(t)=G_1G_2[f(t)\pm 2Kf(t-T)+K^2f(t-2T)]$$

In empirically determining the values of T and K, the value of T is determined first. A recorded seismic signal from the area in which the marine seismic exploration takes place is fed to the input of the filter. The jack 14 is disconnected and the gain of amplifier 16 is changed to ±1 so that the filter operates in accordance with Formula 1. The jack 13 and the switch 15 are first adjusted to provide a first value of T which is determined from a FATHOMETER reading. The value of $K_1$ is adjusted to an approximate value determined from the approximated value of T and estimated values of the reflection coefficients. With the filter of FIGURE 1 so adjusted, the output signal from the filter of FIGURE 1 is applied to the band pass filters 31 of FIGURE 2. The time delay circuit 35 is adjusted so that the output signal from the filter of FIGURE 1 will be integrated over an interesting or useful part of the signal. The integration is then repeated for increasing values of T, as effected by adjusting the jack 13 and the switch 15, until a minimum reading is obtained on the meter 40. When this minimum reading is obtained, the value of T represented by the positions of the jack 13 and switch 15 will be the true value of T.

After the determination of T, the determination of K is carried out. To make this determination, the jack 14 is connected to the delay line 12 to provide a delay of 2T, twice that effected by the positions of the jack 13 and the switch 15. The gain $K_1$ of the amplifiers 19 and 20 is first set to be zero. With the filter of FIGURE 1 so adjusted, the output signal from the filter is applied to the band pass filter 31 in the circuit shown in FIGURE 2. The time delay circuit 35 is adjusted as it was in the T determination. The integration is carried out and the resulting reading is obtained from the meter 40. The integration is then repeated for increasing values of $K_1$ until a minimum value from the integration is obtained. The value of $K_1$ to give this minimum value to the integral will be the true value of $K_1$ to satisfy the requirement that $K_1 K_T = K$. Thus the value of T and K can be obtained empirically.

In the determination of $K_1$, which in effect is a determination of K, the presence of a high noise (other than reverberations) signal biases the result. Hence, it is necessary to time and space filter $f(t)$ appropriately to achieve a sufficient signal/noise ratio before feeding it to the time domain filter.

The above description is of a preferred embodiment of the invention and many modifications can be made thereto without departing from the spirit and scope of the invention, which is limited only as defined in the appended claims.

What is claimed is:

1. A method of filtering a seismic signal obtained from marine seismic exploration in which the seismic signal is detected in a water layer comprising the steps of delaying the seismic signal for a first time interval equal to the time it takes a sound wave to travel back and forth in said water layer, delaying the seismic signal for a second time interval equal to twice said first time interval, amplifying the signal which is delayed for said first interval by an amount such that the ratio of the signal delayed for said first interval to the undelayed signal is equal to twice the product of the reflection coefficients of the top and bottom of said water layer, amplifying the signal which is delayed for said second time interval by an amount such that the ratio of the amplitude of the signal delayed for said second interval to the undelayed seismic signal is equal to the product of the reflection coefficients squared, and algebraically adding the undelayed seismic signal, the amplified signal delayed for said first interval, and the amplified signal delayed for said second interval.

2. A method of filtering a seismic signal obtained from marine seismic exploration in which said signal is detected in a water layer comprising the steps of delaying said seismic signal for a time interval equal to the time it takes for a sound wave to travel back and forth in said water layer, amplifying the signal which is delayed for said interval by an amount such that the ratio of the amplitude of the delayed signal to the amplitude of the undelayed signal is equal to the product of the reflection coefficients of the top and bottom of said water layer, and algebraically adding the amplified delayed signal to the undelayed seismic signal.

3. A method of filtering a seismic signal obtained from marine seismic exploration in which the signal is detected in a water layer comprising the steps of delaying said seismic signal for a time interval equal to the time it takes for a sound wave to travel back and forth in said water layer and algebraically adding the delayed signal to the undelayed seismic signal.

4. A seismic signal filter comprising delay means to delay an input signal for a first interval and to delay said input signal for a second interval, means to apply the input signal to said delay means, means to select the length of said first interval and the length of said second interval, amplifying means to amplify the signal delayed by said delay means for said first interval by a factor of two, a first variable gain amplifier connected to amplify the signal delayed by said delay means for said second interval, a first summing circuit connected to algebraically add the output signal from said amplifying means and the output signal from said first variable gain amplifier, a second variable gain amplifier connected to amplify the output signal of said first summing circuit, and a second summing circuit connected to algebraically add said input signal and the output signal from said second variable gain amplifier.

5. A seismic signal filter as recited in claim 4 wherein the controls of said first and second variable gain amplifiers are ganged so that the gain of said first and second variable gain amplifiers are always equal.

6. A seismic signal filter comprising a delay means to delay an input signal for a first interval and to delay said input signal for a second interval, means to apply the input signal to said delay means, means to select the length of said first interval and the length of said second interval, a first variable gain amplifier connected to amplify the gain of the signal delayed by said delay means for said second interval, a first summing circuit connected to algebraically add the signal delayed by said delay means for said first interval and the output signal of said first variable gain amplifier, a second variable gain amplifier connected to amplify the output signal of said first summing circuit, and a second summing circuit connected to algebraically add the output signal of said second variable gain amplifier and said input signal.

7. A seismic signal filter comprising delay means to delay an input signal for a first interval and to delay said input signal for a second interval, said second interval having a length twice that of said first interval, means to apply the input signal to said delay means, amplifying means to amplify the signal delayed for said first interval by a factor of two, a first amplifier connected to amplify the signal delayed by said delay means for said second interval, a first summing circuit connected to algebraically add the output signal of said amplifying means and the output signal of said first amplifier, a second amplifier connected to amplify the output signal of said first summing circuit, said second amplifier having a gain equal to that of said first amplifier, and a second summing circuit connected to algebraically add said input signal and the output signal of said second amplifier.

8. A seismic signal filter comprising delay means to delay an input signal for a first interval and to delay said input signal for a second interval, means to apply the input signal to said delay means, means to select the length of said first interval and the length of said second interval, an amplifying means selectively controllable to amplify the signal delayed by said delay means for said first interval by a factor of one or a factor of two, a first variable gain amplifier connected to amplify the signal delayed by said delay means for said second interval, a first summing circuit connected to algebraically add the output signal of said amplifying means and the output signal from said first variable gain amplifier, means to optionally disconnect the signal delayed by said delay means for said second interval from said first summing circuit, a second variable gain amplifier connected to amplify the output signal from said first summing circuit, and a second summing circuit connected to algebraically add said input signal and the output signal of said second variable gain amplifier.

9. A parameter determining system adapted to be connected with a seismic signal filter comprising means to rectify a signal, a gate connected therewith, an integrator connected to said gate, trigger means, a first time delay means connected to said trigger means, a second time delay means connected to said first time delay means, means to open said gate responsive to an output signal from said first time delay means and to close said gate responsive to a signal from said second time delay means.

10. A seismic signal filter according to claim 4 further including a parameter determining system comprising rectifying means connected to said second summing circuit, a gate connected to said rectifying means, an integrator connected to said gate, trigger means, a first time delay connected to said trigger means, a second time delay means connected to said first time delay means, means to open said gate in response to an output signal from said first time delay means and to close said gate in response to a signal from said second time delay means.

11. The method of determining delay times and reflection coefficients with respect to a marine seismic exploration comprising rectifying the output of a filtered seismic signal, gating the rectified output responsive to delayed time signals, and integrating the gated rectified output.

12. The method of claim 1 wherein the delay times and reflection coefficients are determined by the steps of setting the delay times and reflection coefficients at an approximated predetermined value, rectifying the algebraically added undelayed seismic signals and amplified signals, gating the rectified output responsive to delayed time signals and integrating the rectified gated output, repeating the said setting, rectifying, gating, and integrating steps to minimize the integral.

13. A seismic signal filter comprising delay means to delay an input signal for a first interval, and to delay the input signal for a second interval, means to apply the input signal to said delay means, means to select the length of said first interval and the length of said second interval, an amplifying means selectively controllable to amplify the signal delayed by said delay means for said first interval by a factor of one or a factor of two, a first variable gain amplifier connected to amplify the signal delayed by said delay means for said second interval, a first summing circuit connected to algebraically add the output signal of said amplifying means and the ouput signal from said first variable gain amplifier, a second variable gain amplifier connected to amplify the output signal from said first summing circuit, and a second summing circuit connected to algebraically add said input signal and the output signal of said second variable gain amplifier.

References Cited by the Examiner
UNITED STATES PATENTS

| | | | |
|---|---|---|---|
| 2,739,237 | 3/1956 | Stone | 250—27 |
| 2,757,356 | 7/1956 | Haggerty | 340—15 |
| 2,783,448 | 2/1957 | Piety | 340—15 |
| 2,785,305 | 3/1957 | Crooks | 250—27 |
| 2,794,965 | 6/1957 | Yost | 340—15 |
| 2,836,359 | 5/1958 | Mazzagatti | 340—15 |
| 2,882,988 | 4/1959 | Dobrin | 340—15 |
| 2,916,724 | 12/1959 | Peterson | 340—15 |
| 2,956,261 | 10/1960 | Grossling | 340—15 |
| 3,064,234 | 11/1962 | Barrett | 343—100.7 |

OTHER REFERENCES

Jones et al.: "Magnetic Delay Line Filtering Techniques," Geophysics, vol. 20, No. 4, October 1955, pp. 745–765.

BENJAMIN A. BORCHELT, *Primary Examiner.*

IRVING L. SRAGOW, CHESTER L. JUSTUS, SAMUEL FEINBERG, *Examiners.*